(12) United States Patent
Huang et al.

(10) Patent No.: US 12,392,966 B2
(45) Date of Patent: Aug. 19, 2025

(54) OPTICAL MODULE

(71) Applicant: Advanced Semiconductor Engineering, Inc., Kaohsiung (TW)

(72) Inventors: Cheng-Ling Huang, Kaohsiung (TW); Ying-Chung Chen, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 164 days.

(21) Appl. No.: 18/092,146

(22) Filed: Dec. 30, 2022

(65) Prior Publication Data

US 2024/0219641 A1    Jul. 4, 2024

(51) Int. Cl.
*G02B 6/293* (2006.01)

(52) U.S. Cl.
CPC .............................. *G02B 6/29301* (2013.01)

(58) Field of Classification Search
CPC ................................................ G02B 6/29301
See application file for complete search history.

(56) References Cited

U.S. PATENT DOCUMENTS

| 9,722,098 | B1 | 8/2017 | Chung et al. |
| 10,170,658 | B2 | 1/2019 | Tsai et al. |
| 2020/0075565 | A1* | 3/2020 | Hsu ...................... H01L 25/167 |
| 2023/0204879 | A1* | 6/2023 | Kim ..................... G02B 6/4214 |
| | | | 385/33 |

FOREIGN PATENT DOCUMENTS

CN        112462855 A   *  3/2021

OTHER PUBLICATIONS

English translation of CN112462855 (Year: 2021).*

* cited by examiner

*Primary Examiner* — Sung H Pak
(74) *Attorney, Agent, or Firm* — FOLEY & LARDNER LLP

(57) ABSTRACT

An optical module is disclosed. The optical module includes a carrier and a lid disposed over the carrier. The carrier and the lid are collaboratively define a first cavity for accommodating a photonic component. The optical module also includes a first electrical contact disposed over a first side of the lid and configured to provide an electronic connection for the optical module. A first aperture penetrating the lid is formed at the first side of the lid and corresponds to a light transmission/reception area of the photonic component.

14 Claims, 14 Drawing Sheets

OPTICAL MODULE

BACKGROUND

1. Field of the Disclosure

The present disclosure relates to an optical module.

2. Description of the Related Art

Photonic integrated circuits (PICs) are expected to be more reliable and highly integrated to support high-speed data communication that is not available with electronic integrated circuits (EICs) alone. A PIC includes multiple optical devices formed over a substrate. Conventionally, a molding compound may be used to encapsulate the PIC. The molding compound overlies the substrate, and the applied force and stress may inadvertently ruin the optical devices.

In addition, it may be desirable to reduce the size of a PIC to fit more optical devices on the same substrate, and using a molding compound to encapsulate the PIC may be disadvantageous with respect to achieving size reduction. Furthermore, when the optical devices are densely packed, optical routing paths may become more complicated, impacting the optical performance.

SUMMARY

In some arrangements, an optical module includes a carrier and a lid disposed over the carrier. The carrier and the lid are collaboratively define a first cavity for accommodating a photonic component. The optical module also includes a first electrical contact disposed over a first side of the lid and configured to provide an electronic connection for the optical module. A first aperture penetrating the lid is formed at the first side of the lid and corresponds to a light transmission/reception area of the photonic component.

In some arrangements, an optical module includes an interconnection structure including a first aperture, an electronic component disposed over the interconnection structure, and a photonic component electrically connected to the electronic component through the interconnection structure. The photonic component is configured to change a first propagation direction of a first light to a second propagation direction toward the first aperture. The first propagation direction is different from the second propagation direction.

In some arrangements, an optical module includes a carrier and a lid disposed over the carrier. An electrical contact is disposed over a side of the lid and configured to provide an electronic connection for the optical module. A first aperture penetrates the first side of the lid and is configured to provide a light passage for the optical module.

BRIEF DESCRIPTION OF THE DRAWINGS

Aspects of some arrangements of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
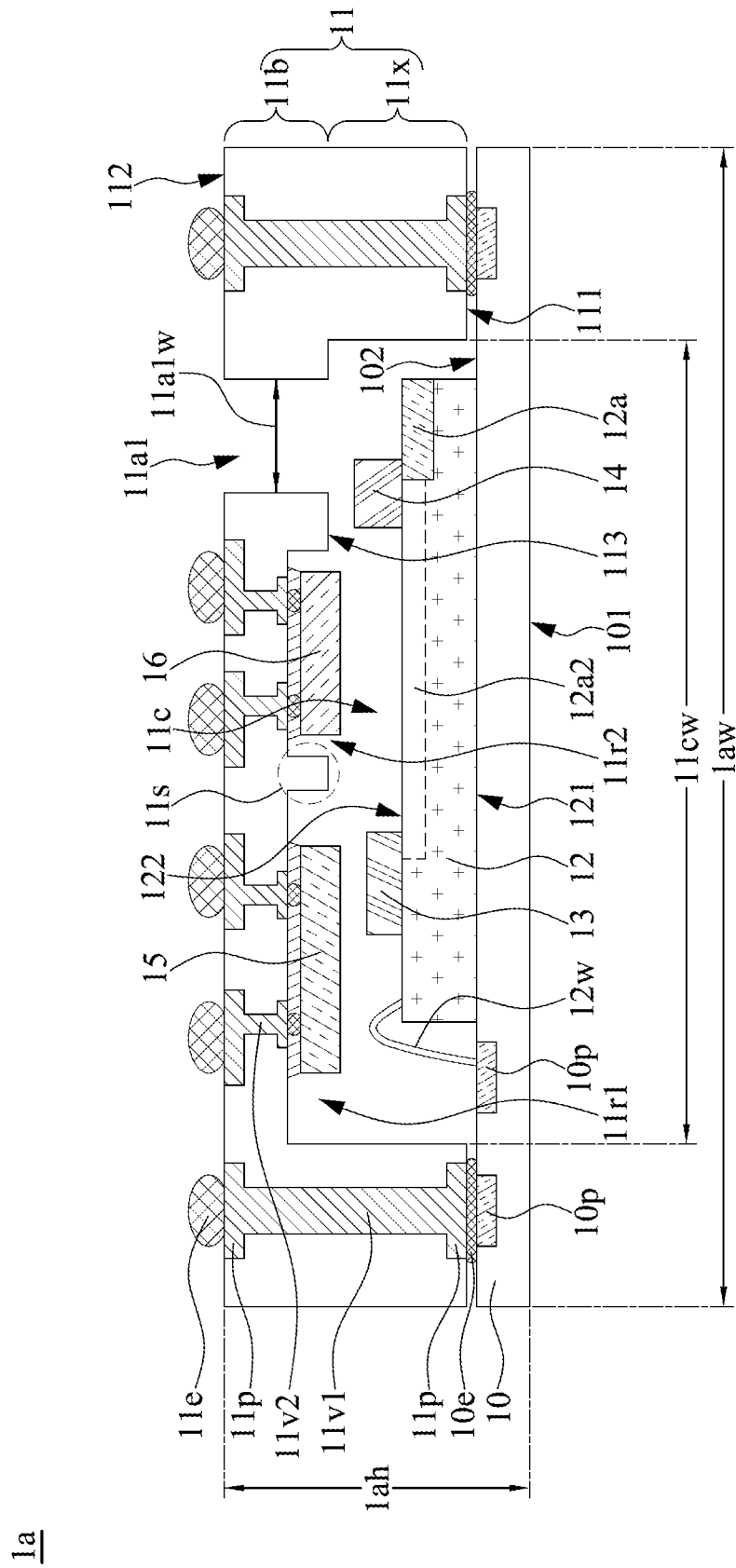
FIG. 1A illustrates a side view of an example of an optical module according to some arrangements of the present disclosure.

Common reference numerals are used throughout the drawings and the detailed description to indicate the same or similar components. Arrangements of the present disclosure will be readily understood from the following detailed description taken in conjunction with the accompanying drawings.

The following disclosure provides many different arrangements, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include arrangements in which the first and second features are formed or disposed in direct contact, and may also include arrangements in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various arrangements and/or configurations discussed.

FIG. 1A illustrates a side view of an example of an optical module 1a according to some arrangements of the present disclosure. The optical module 1a may include a carrier 10, an interconnection structure 11, a photonic component 12, an optical emitter 13, an optical receiver 14, and electronic components 15, 16.

The carrier 10 may include a substrate. The carrier 10 may include a printed circuit board (PCB), such as a paper-based copper foil laminate, a composite copper foil laminate, or a polymer-impregnated glass-fiber-based copper foil laminate. In some arrangements, the carrier 10 may include an interconnection structure, such as a redistribution layer (RDL) or a grounding element.

The carrier 10 may include a surface 101 and a surface 102 opposite to the surface 101. The carrier 10 may include one or more conductive pads 10$p$ in proximity to, adjacent to, or embedded in and exposed from the surface 101 and/or the surface 102. The carrier 10 may include a solder resist (not shown) on the surface 101 and/or the surface 102 to fully expose or to expose at least a portion of the conductive pads 10$p$ for electrical connections.

The interconnection structure 11 may be disposed over or on the surface 102 of the carrier 10. The interconnection structure 11 may be electrically connected to the carrier 10 using electrical contacts 10$e$ over (e.g., contacting directly) the conductive pads 10$p$. In some arrangements, the electrical contacts 10$e$ may include a solder ball, such as a controlled collapse chip connection (C4) bump, a ball grid array (BGA), a land grid array (LGA), and so on. In some arrangements, the electrical contacts 10$e$ may include a conductive pad, a conductive via, a conductive pillar, a conductive wire, or a combination thereof.

The interconnection structure 11 may include a surface 111 facing the carrier 10 and a surface 112 facing away from the carrier 10 and opposite to the surface 111. The interconnection structure 11 may be spaced apart from the surface 102 of the carrier 10. For example, the interconnection structure 11 may not directly contact the carrier 10. For example, there may be a gap between the surface 111 of the interconnection structure 11 and the surface 102 of the carrier 10. The electrical contacts 10$e$ may be disposed in the gap. The electrical contacts 10$e$ may be disposed between the surface 111 of the interconnection structure 11 and the surface 102 of the carrier 10.

The interconnection structure 11 may include a lid, a housing, a covering, a wall, etc. In some arrangements, the interconnection structure 11 may have a base portion 11$b$ and an extending portion (or a sidewall) 11$x$ extending from the base portion 11$b$. The base portion 11$b$ may have or define the surface 112 and a surface 113 opposite to the surface 112. The extending portion 11$x$ may extend between the surface 113 and the surface 111. The extending portion 11$x$ may be located over a periphery of the base portion 11$b$. The extending portion 11$x$ may define a central hole over the base portion 11$b$. In some arrangements, the extending portion 11$x$ and the base portion 11$b$ of the interconnection structure 11 may include a monolithic structure. In some arrangements, the extending portion 11$x$ and the base portion 11$b$ of the interconnection structure 11 may be formed of one piece. In some arrangements, the extending portion 11$x$ and the base portion 11$b$ of the interconnection structure 11 may be pieces separately formed and then combined together.

The interconnection structure 11 may have or define an opening or a cavity 11$c$. The cavity 11$c$ may be recessed from the surface 111 and covered by the carrier 10. The surface 113 may constitute a bottom surface of the cavity 11$c$. The extending portion 11$x$ may constitute a sidewall of the cavity 11$c$.

The cavity 11$c$ may include an air-filled physical cavity, or the cavity 11$c$ may be filled with a material other than the material forming the interconnection structure 11. For example, the cavity 11$c$ may be filled with a light transmissive material. In some arrangements, the light transmissive material may be a clear epoxy or other light transmissive epoxy or other resin or polymer. In some arrangements, a width 11$cw$ of the cavity 11$c$ may be from about 9 millimeters (mm) to about 15 mm, such as 10 mm, 11 mm, 12 mm, 13 mm, or 14 mm.

In some arrangements, the cavity 11$c$ may be configured to accommodate the photonic component 12, the optical emitter 13, the optical receiver 14, and the electronic components 15, 16. The carrier 10 and the interconnection structure 11 may collectively or collaboratively define a space to accommodate the photonic component 12, the optical emitter 13, the optical receiver 14, and the electronic components 15, 16. The extending portion 11$x$ of the interconnection structure 11 may surround the photonic component 12, the optical emitter 13, the optical receiver 14, and the electronic components 15, 16.

The interconnection structure 11 may have or define recessed portions 11$r$1 and 11$r$2. The recessed portions 11$r$1 and 11$r$2 may be formed in the based portion 11$b$ of the interconnection structure 11. The recessed portions 11$r$1 and 11$r$2 may each be recessed from the surface 113. The electronic component 15 may be disposed or received in the recessed portion 11$r$1 and the electronic component 16 may be disposed or received in the recessed portion 11$r$2.

The recessed portions 11$r$1 and 11$r$2 may be separated by a protruding portion 11$s$. The protruding portion 11$s$ may protrude from the surface 113. The electronic components 15 and 16 may be isolated or spaced apart by the protruding portion 11$s$. The protruding portion 11$s$ may function as a stopper to prevent bridge issues (e.g., solder or other connection material flows from the recessed portion 11$r$1 to the recessed portion 11$r$2, or vice versa) when the electronic components 15 and 16 are connected to the interconnection structure 11 by heat and compression technique(s).

The interconnection structure 11 may have or define a hole, a through hole, or an aperture 11$a$1. The aperture 11$a$1 may be formed at the surface 112. The aperture 11$a$1 may extend between the surface 112 and the surface 113. The aperture 11$a$1 may penetrate the base portion 11$b$ of the interconnection structure 11. The aperture 11$a$1 may extend from the surface 112 to the cavity 11$c$. The cavity 11$c$ may be exposed to air through the aperture 11$a$1.

The aperture 11$a$1 may include an air-filled physical cavity, or the aperture 11$a$1 may be filled with a material other than the material forming the interconnection structure 11. For example, the aperture 11$a$1 may be filled with a light transmissive material. In some arrangements, a width 11$a$1$w$ of the aperture 11$a$1 may be greater than an active area (such as an optical phased array (OPA) 12$a$) of the photonic component 12.

In some arrangements, the aperture 11$a$1 may be configured to provide a light passage for the optical module 1$a$. In some arrangements, the aperture 11$a$1 may be configured to allow light to pass through. For example, the light radiated from the photonic component 12 may pass through the aperture 11$a$1. A light transmission area of the photonic component 12 may be at least partially exposed from the surface 112 of the interconnection structure 11. As such, the surface 112 of the interconnection structure 11 may function as a light transmission surface of the optical module 1$a$. The interconnection structure 11 may have or define multiple apertures. For example, the interconnection structure 11 may have apertures 11$a$1 and 11$a$2 shown in FIG. 1B. In some arrangements, different apertures may be configured to allow different lights (such as lights from different light sources) to pass through. For example, the aperture 11$a$2 shown in FIG. 1B may be configured to allow light outside of the optical module 1$a$ to pass through and be detected by the optical receiver 14. A light reception area of the optical receiver 14 may be at least partially exposed from the surface 112 of the interconnection structure 11. As such, the surface 112 of the interconnection structure 11 may function as a light reception surface of the optical module 1a. In some arrangements where the interconnection structure 11 having the apertures 11a1 and 11a2, the surface 112 of the interconnection structure 11 may function as a light transceiving surface of the optical module 1a.

In some arrangements, the surface 112 of the interconnection structure 11 and/or the sidewall of the aperture 11a1 may be coated with an anti-reflection coating to improve coupling of light into the cavity 11c.

The interconnection structure 11 may be configured to provide input/output (I/O) access, such as I/O pads, for the optical module 1a with an external component (e.g., external circuits or circuit boards). For example, electrical contacts 11e may be disposed over or on the surface 112 of the interconnection structure 11. The electrical contacts 11e may be similar to the electrical contacts 10e and a description thereof is not repeated hereinafter for conciseness. In some arrangements, since the aperture 11a1 (and/or the aperture 11a2 shown in FIG. 1B) and the electrical contacts 11e are over or on the same surface (i.e., the surface 112 of the interconnection structure 11), the I/O access for optical routing paths and the I/O access for signal routing paths may be arranged over the same side of the optical module to increase the space utilization and achieve size reduction. The electrical contacts 11e and the electrical contacts 10e may respectively be adjacent to opposite sides of the interconnection structure 11.

The interconnection structure 11 may be configured to provide I/O access, such as I/O) pads, for the electronic components 15 and 16 to the carrier 10. For example, the electronic components 15 and 16 may be electrically connected with the carrier 10 through the interconnection structure 11.

The interconnection structure 11 may include an encapsulant 11m and conductive elements 11v1, 11v2. In some arrangements, the encapsulant 11m may include an epoxy resin having fillers, a molding compound (e.g., an epoxy molding compound or another molding compound), a polyimide, a phenolic compound or material, a material with a silicone dispersed therein, or a combination thereof. In some arrangements, the encapsulant 11m may include an opaque material. In some arrangements, the opaque material may be an opaque epoxy (e.g., a black epoxy) or other opaque resin or polymer.

The conductive elements 11vl and 11v2 may each at least partially penetrate the encapsulant 11m and contact a conductive pad. The conductive elements 11v1 and 11v2 may each include a conductive pillar, a conductive via (such as a through mold via (TMV)), a conductive trace, a conductive wire, or other feasible connectors.

The interconnection structure 11 may include one or more conductive pads 11p in proximity to, adjacent to, or embedded in and exposed from the surface 111, the surface 112 and/or the surface 113. A width of one of the conductive pads 11p may be greater than a width of one of the conductive elements 11v1 and 11v2.

The conductive elements 11v1 may connect the conductive pads 11p exposed from the surface 112 with the conductive pads 11p exposed from the surface 111. The conductive elements 11v2 may connect the conductive pads 11p exposed from the surface 112 with the conductive pads 11p exposed from the surface 113. In some arrangements, a length of one of the conductive elements 11vl may be greater than a length of one of the conductive elements 11v2.

However, in some arrangements, the conductive pads 11p may be omitted and the conductive elements 11v1 and 11v2 may each be exposed from the surface 111, the surface 112 and/or the surface 113. For example, the conductive elements 11v1 may penetrate the base portion 11b and the extending portion 11x of the interconnection structure 11. The conductive elements 11v1 may extend between the surface 111 and the surface 112 of the interconnection structure 11. The conductive elements 11v2 may penetrate the base portion 11b of the interconnection structure 11. The conductive elements 11v2 may extend between the surface 112 and the surface 113 of the interconnection structure 11.

In some arrangements, one or more of the conductive elements 11vl and 11v2 may taper toward the carrier 10. In some arrangements, one or more of the conductive elements 11v1 and 11v2 may taper away from the carrier 10. In some arrangements, one or more of the conductive elements 11vl and 11v2 may have a constant width.

The photonic component 12 may be disposed over or on the carrier 10. The photonic component 12 may be electrically connected to the carrier 10 through solder bonding, Cu-to-Cu bonding, wire bonding, or hybrid bonding. For example, the photonic component 12 may be electrically connected to the carrier 10 through a conductive wire 12w.

The photonic component 12 may be physically separated from the interconnection structure 11. The photonic component 12 may be spaced apart from the interconnection structure 11.

The photonic component 12 may include a silicon photonics substrate, and one or more optical devices and/or photonic integrated circuits. In some arrangements, the silicon photonics substrate may include a Silicon on Insulator (SOI) substrate including a silicon substrate, an oxide layer disposed on the silicon substrate, and a silicon layer disposed on the oxide layer. Examples of the optical devices and/or photonic integrated circuits may include an optical transmitter, an optical receiver, an optical transceiver, optical waveguides, optical gratings, optical resonators, optical multiplexers, optical demultiplexers, optical modulators, optical switches, optical transducers, and so on.

The photonic component 12 may have a surface 121 facing and contacting the carrier 10 and a surface 122 opposite to the surface 121. The surface 121 of the photonic component 12 may include a backside surface. The surface 122 of the photonic component 12 may include an active surface. As used herein, the term "active side" or "active surface" of a component may refer to a side or a surface of a component over which electrical or contact terminals such as contact pads, conductive studs or conductive pillars are disposed, for transmission of electrical signals or power. The "backside," "backside surface," "inactive side," or "inactive surface" of a component may refer to a surface of the component over which no contact terminals are disposed.

The surface 122 of the photonic component 12 may be spaced apart from the interconnection structure 11. The surface 122 of the photonic component 12 may be at least partially exposed to air through the cavity 11c.

In some arrangements, the photonic component 12 may include an optical phased array (OPA) 12a. The OPA 12a may be configured to control the phase and/or amplitude of light generated by the optical emitter 13, to adjust the wavefront of the light, to steer the direction of light, and to form a desired radiation pattern. The OPA 12a may include an active area of the photonic component 12. The OPA 12a may include a light transmission area, a light reception area, or a light transceiving area. The OPA 12a may be at least partially exposed to air through the cavity 11c. The details of the OPA 12a will be further described with respect to FIG. 1D. The OPA 12a may be spaced apart from the interconnection structure 11.

The optical emitter 13 may be disposed over the surface 122 of the photonic component 12. The optical emitter 13 may be configured to generate light or other electromagnetic radiation in the ultraviolet, visible, and/or infrared spectral regions. In some arrangements, the light generated by the optical emitter 13 may be guided through optical devices of the photonic component 12 and may be radiated through the OPA 12a and the aperture 11a1. In some arrangements, the propagation direction of the light generated by the optical emitter 13 may be changed or adjusted by the photonic component 12. In some arrangements, the propagation direction of the light generated by the optical emitter 13 may be different from the propagation direction of the light radiated by the OPA 12a. In some arrangements, the light generated by the optical emitter 13 may propagate toward the photonic component 12 in a direction substantially perpendicular to the surface 122 of the photonic component 12. In some arrangements, the light generated by the optical emitter 13 may propagate toward the OPA 12a in a direction substantially parallel to the surface 122 of the photonic component 12. In some arrangements, the light radiated by the OPA 12a may propagate toward the aperture 11a1 in a direction substantially perpendicular to the surface 122 of the photonic component 12.

The optical emitter 13 may include a light emitting diode (LED), a laser diode (such as vertical cavity surface-emitting laser (VCSEL)), a lamp, a laser, any other suitable light source, or a combination thereof. For example, the optical emitter 13 may include a light source that emits visible light of one or more wavelengths (or frequencies, or bandwidths), such as red, blue, and green light. In some other arrangements, the optical emitter 13 may include a light source that emits invisible light of one or more wavelengths (or frequencies, or bandwidths), such as infrared light. The optical emitter 13 may include any number of light sources, such as an array of pixels.

The optical receiver 14 may be disposed over the surface 122 of the photonic component 12. The optical receiver 14 may be configured to receive the light passing through an aperture of the interconnection structure 11 (such as the aperture 11a2 illustrated in FIG. 1B) and generate electrical signals (e.g., an electrical current) to the electronic components 15 and/or 16. For example, the optical receiver 14 may convert light energy in the form of photons into an electric current. The electrical signals may be related to one or more properties of the light, such as luminous flux (or luminous power or brightness), luminous intensity, propagation direction, wavelength (or frequency, or bandwidth), polarization state, etc.

In some arrangements, the electrical signals generated by the optical receiver 14 may be transmitted to the electronic components 15 and/or 16 through the photonic component 12, the carrier 10, and the interconnection structure 11.

The optical receiver 14 may include a photo-detector, a photo-sensor, a photodiode (PD), a charge-coupled device (CCD), a photomultiplier tube, a camera, a spectrometer, or another light-sensitive electronic device.

The positions and number of the optical emitter 13 and the optical receiver 14 in the optical module 1a are not intended to limit the present disclosure. For example, there may be any number of optical emitter(s) in the optical module 1a due to design needs. For example, there may be any number of optical receiver(s) in the optical module 1a due to design needs.

The electronic component 15 may be disposed over or on the interconnection structure 11 and in the recessed portion 11r1. The electronic component 15 may be electrically connected to the interconnection structure 11 through solder bonding, Cu-to-Cu bonding, wire bonding, or hybrid bonding. For example, the electronic component 15 may be electrically connected to the interconnection structure 11 using electrical contacts over (e.g., contacting directly) the interconnection structure 11. An underfill may be disposed over the interconnection structure 11 to cover or encapsulate the electrical contacts. The electronic component 15 may include an active surface facing the interconnection structure 11 and a backside surface facing away from the interconnection structure 11.

The electronic component 16 may be disposed over or on the interconnection structure 11 and in the recessed portion 11r2. The electronic component 16 may be electrically connected to the interconnection structure 11 through solder bonding, Cu-to-Cu bonding, wire bonding, or hybrid bonding. For example, the electronic component 16 may be electrically connected to the interconnection structure 11 using electrical contacts over (e.g., contacting directly) the interconnection structure 11. An underfill may be disposed over the interconnection structure 11 to cover or encapsulate the electrical contacts. The electronic component 16 may include an active surface facing the interconnection structure 11 and a backside surface facing away from the interconnection structure 11.

The electronic components 15 and 16 may each include a micro-electromechanical system (MEMS) or an integrated device or system that combine mechanical and electrical components. The electronic components 15 and 16 may each include a processor, a controller, a memory, or an input/output (I/O) buffer, etc.

For example, the electronic components 15 and 16 may each include a central processing unit (CPU), a microprocessor unit (MPU), a graphics processing unit (GPU), a microcontroller unit (MCU), an application-specific integrated circuit (ASIC), a field-programmable gate array (FPGA), or another type of computing element or integrated circuit. For example, the electronic components 15 and 16 may each include a non-transitory memory or a non-volatile memory (such as a flash memory and a read-only memory (ROM)) or a volatile memory (such as a Dynamic Random Access Memory (DRAM)).

In some arrangements, the electronic components 15 and/or 16 may be electrically connected to the optical emitter 13 and the optical receiver 14. The electrical connections may be established by the interconnection structure 11, the carrier 10, and the photonic component 12.

In some arrangements, the electronic components 15 and/or 16 may be configured to process (e.g., analysis, modify, synthesize, convert to a digital signal, and amplify, etc.), to store, and/or to transmit the electrical signals generated by the optical receiver 14. For example, the electrical signals may be further processed by the electronic components 15 and/or 16 to determine a biological parameter, such as a pulse travel time (PTT), an electroencephalogram (EEG), electrocardiogram (ECG), electromyogram (EMG), electrooculogram (EOG), galvanic skin response (GSR), sweat composition, pH, heart rate variability (HRV), or other biologically-relevant information. In some arrangements, the electronic components 15 and/or 16 may receive the electrical signals from the optical receiver 14 and control the optical emitter 13 based on the electrical signals.

Figure 1B:
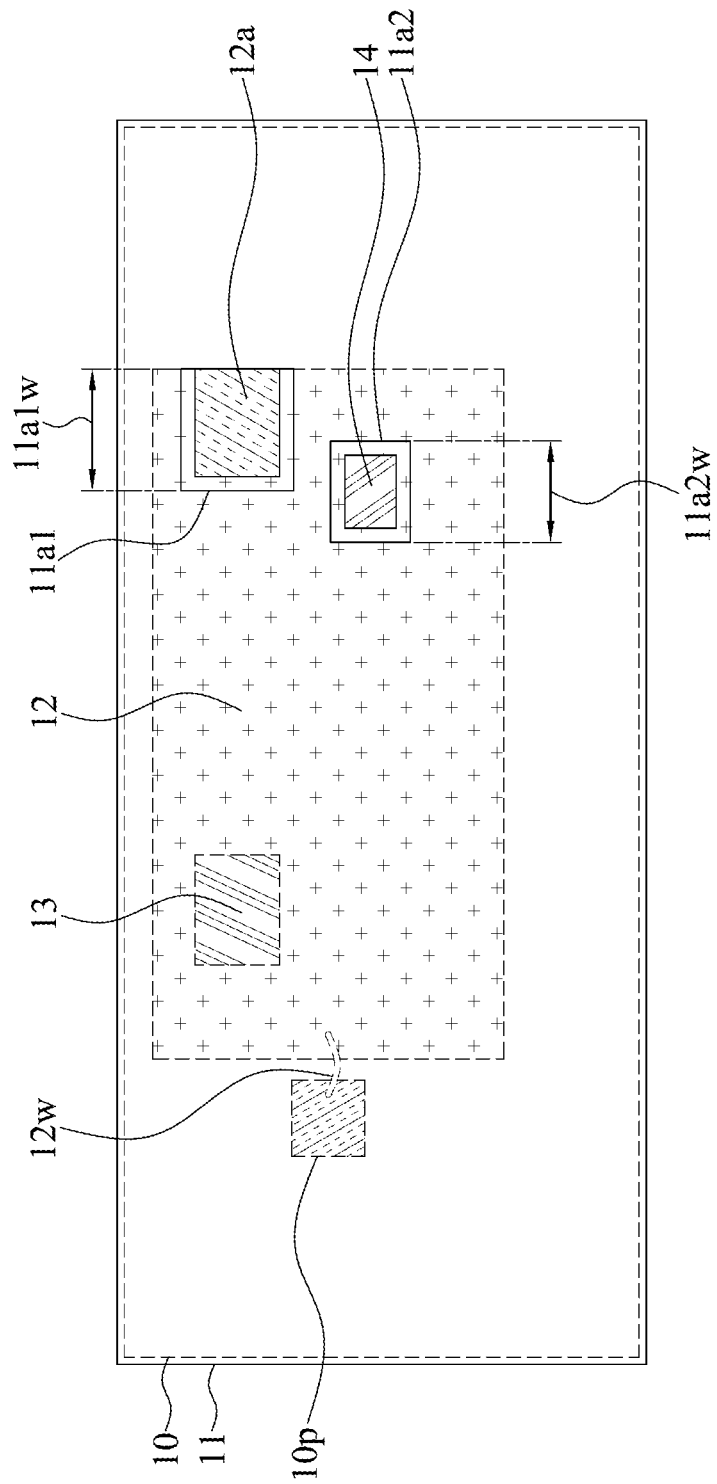
FIG. 1B illustrates a top view of an example of an optical module according to some arrangements of the present disclosure.

FIG. 1B illustrates a top view of an example of the optical module 1a according to some arrangements of the present disclosure. Some elements or components in FIG. 1A are omitted in FIG. 1B for conciseness.

The aperture 11a2 may be spaced apart from the aperture 11a1. The aperture 11a2 may be similar to the aperture 11a1 and a description thereof is not repeated hereinafter for conciseness.

The OPA 12a and the aperture 11a1 may be at least partially overlapped or aligned from the top view. The OPA 12a may be at least partially exposed from the aperture 11a1. The aperture 11a1 may be arranged over interconnection structure 11 according to a location of an active area of the photonic component 12 (such as a light transmission area, a light reception area, or a light transceiving area of the photonic component 12). The aperture 11a1 may be arranged over interconnection structure 11 according to the location of the OPA 12a. In some arrangements, the aperture 11a1 may be configured to allow light radiated by the OPA 12a to pass through. In some arrangements, a width 11a1w of the aperture 11a1 may be greater than (e.g., is about 10% greater than, about 20% greater than, about 30% greater than, or more than about 30% greater than) a width of the OPA 12a.

The optical receiver 14 and the aperture 11a2 may be at least partially overlapped or aligned from the top view. The optical receiver 14 may be at least partially exposed from the aperture 11a2. The aperture 11a2 may be arranged over interconnection structure 11 according to a location of a light reception area (such as the optical receiver 14). In some arrangements, the aperture 11a2 may be configured to allow light to pass through and to be detected by the optical receiver 14. In some arrangements, a width 11a2w of the aperture 11a2 may be greater than (e.g., is about 10% greater than, about 20% greater than, about 30% greater than, or more than about 30% greater than) a width of the optical receiver 14.

The width 11a1w and the width 11a2w are not intended to limit the present disclosure. For example, the size of the apertures can be scaled down to prevent undesired light being detected and to thus increase the accuracy of the optical module 1a.

Figure 5:
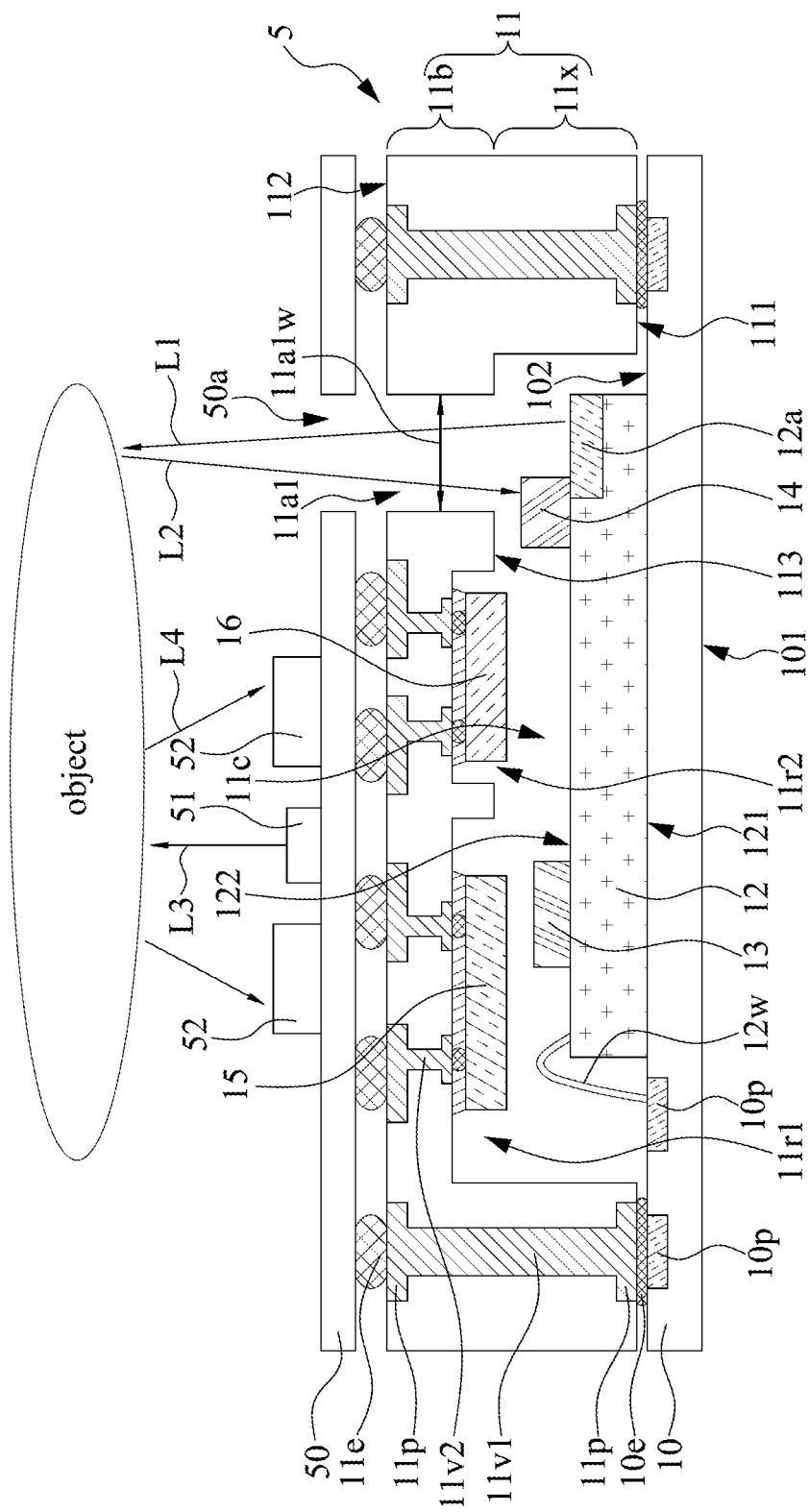
FIG. 5 illustrates an interactive diagram of an optical module and an object according to some arrangements of the present disclosure.

In some arrangements, the aperture 11a1 may be configured to provide the light transmission path and the aperture 11a2 may be configured to provide the light reception path. Arranging the light transmission path and the light reception path through different apertures may help reduce signal interference, and the sensing quality can be improved. However, in some arrangements, the OPA 12a and the optical receiver 14 may each be at least partially exposed from the same aperture (as shown in FIG. 5). As such, the space utilization may be increased.

In a comparative arrangement, the photonic component 12 may be encapsulated by a molding compound. The molding compound may overlie the photonic component 12 and the applied force and stress may unintentionally ruin the optical devices thereon.

According to some arrangements of the present disclosure, by using the interconnection structure 11, the surface 122 of the photonic component 12 may be spaced apart from the interconnection structure 11. The surface 122 of the photonic component 12 may be at least partially exposed to air through the cavity 11c. The risk of breaking the optical devices on the photonic component 12 is eliminated.

In addition, the size of the optical module 1a can be further reduced in comparison with using the molding compound. For example, as shown in FIG. 1A, a height or thickness 1ah of the optical module 1a may be from about 0.7 mm to about 1.2 mm, such as 0.8 mm, 0.9 mm, or 1.1 mm. A width law of the optical module 1a may be from about 13 mm to about 19 mm, such as 14 mm, 15 mm, 16 mm, 17 mm, or 18 mm.

Furthermore, since the aperture 11a1 (and/or the aperture 11a2 shown in FIG. 1B) and the electrical contacts 11e are over or on the same surface (i.e., the surface 112 of the interconnection structure 11), the I/O access for optical routing paths and the I/O access for signal routing paths may be arranged over the same side of the optical module to increase the space utilization and achieve size reduction.

Figure 1C:
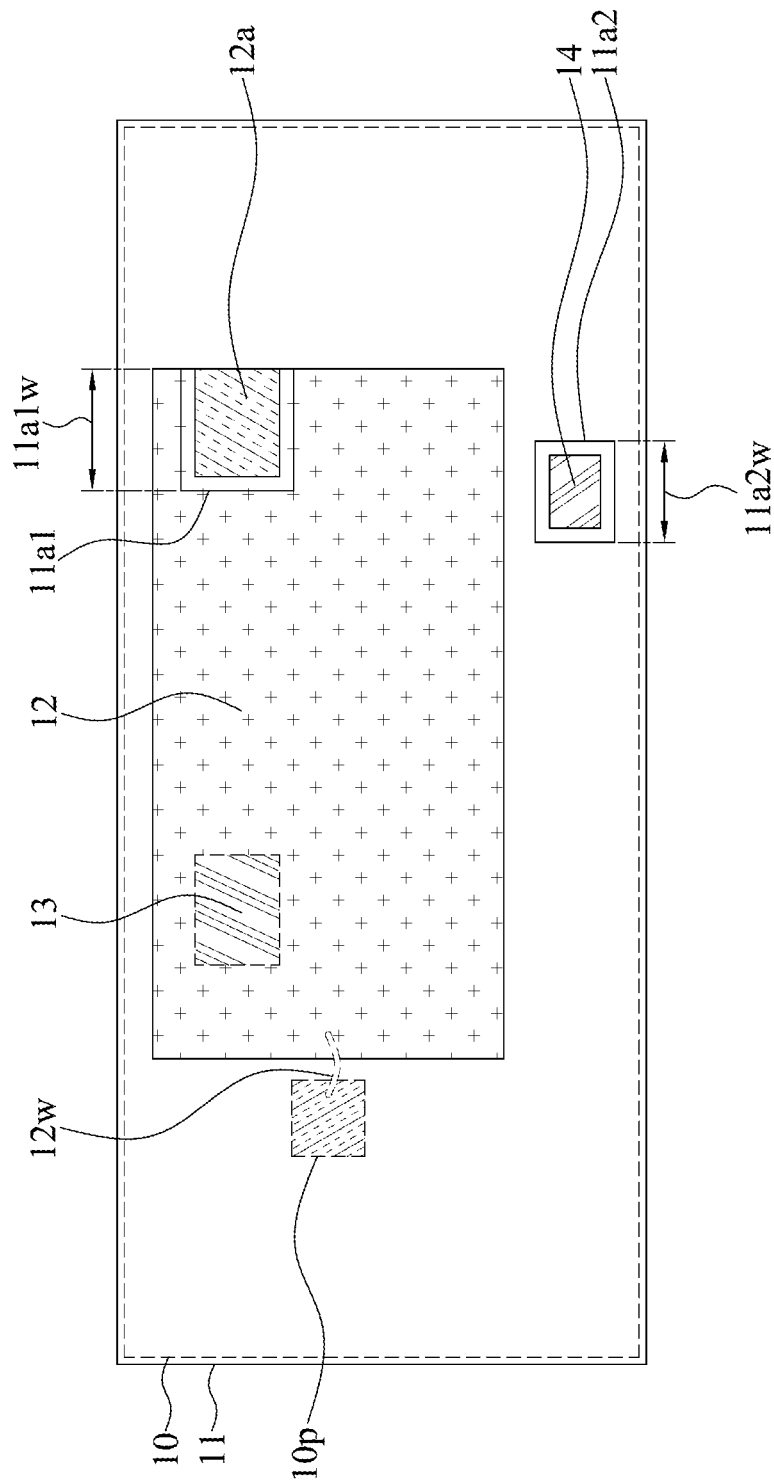
FIG. 1C illustrates a top view of an example of an optical module according to some arrangements of the present disclosure.

FIG. 1C illustrates a top view of an example of an optical module 1c according to some arrangements of the present disclosure. The optical module 1c is similar to the optical module 1a in FIG. 1B except for the differences described as follows.

The optical receiver 14 may be disposed over the carrier 10 and laterally spaced apart from the photonic component 12. In some arrangements, the electrical signals generated by the optical receiver 14 may be transmitted to the electronic components 15 and/or 16 through the carrier 10 and the interconnection structure 11. In comparison with the optical module 1a in FIG. 1B, the light reception path may be shorter, insertion loss may be decreased and sensibility of the optical receiver 14 may be improved.

Figure 1D:
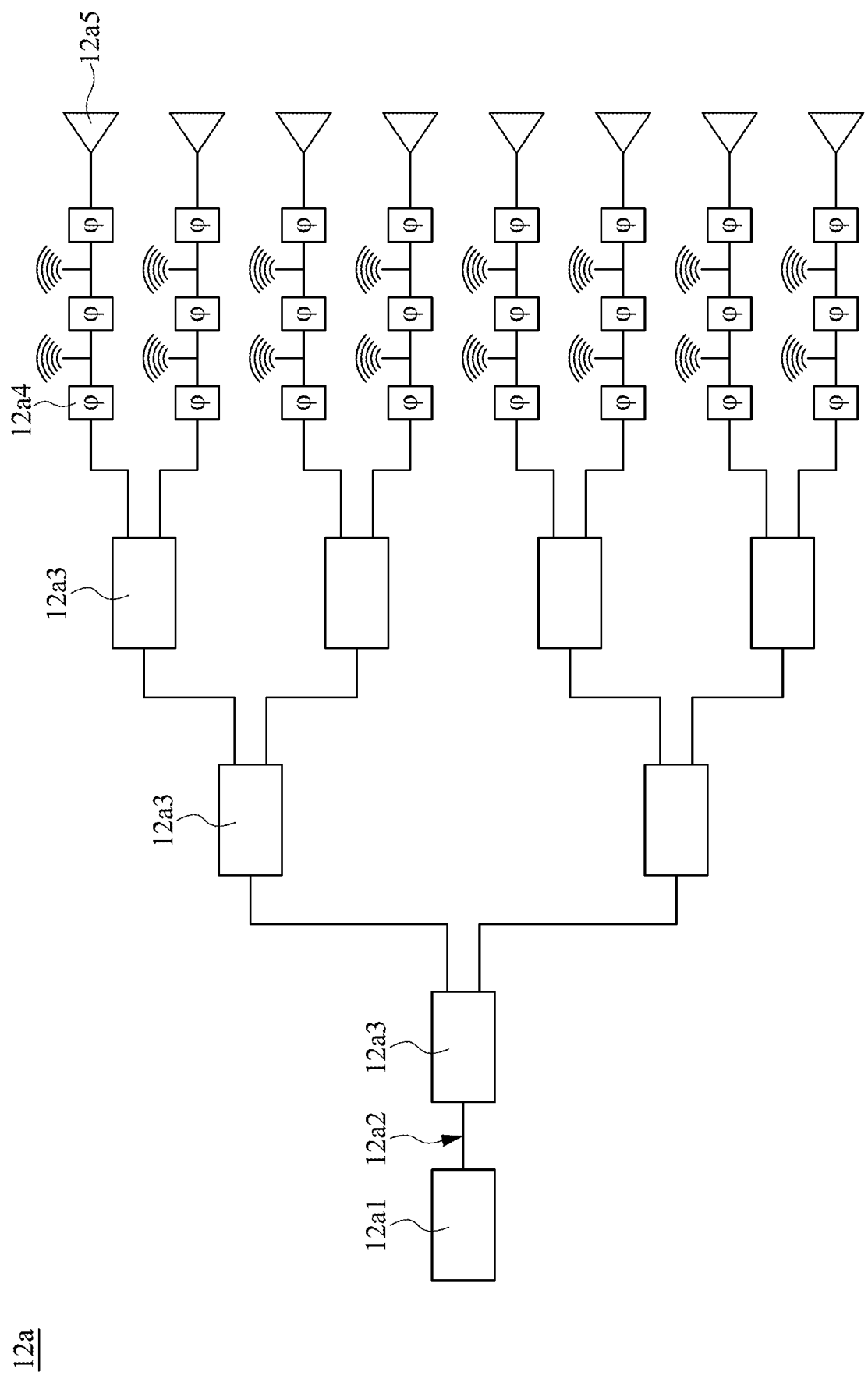
FIG. 1D illustrates a schematic diagram of an example of an optical phase array (OPA) according to some arrangements of the present disclosure.

FIG. 1D illustrates a schematic diagram of an example of the OPA 12a according to some arrangements of the present disclosure. The OPA 12a may include a light source 12a1, one or more waveguides 12a2, one or more light splitters 12a3, one or more phase shifters 12a4, and one or more radiators 12a5.

The light source 12a1 may include a laser. The light source 12a1 may be directly coupled to the waveguides 12a2 or may be coupled to the waveguides 12a2 through an optical fiber, a grating coupler or a beam inverter. The waveguides 12a2 may be configured to guide the light from the light source 12a1 to the radiators 12a5. The waveguides 12a2 may be generally formed of semiconductor or an insulating material, and may have a structure of a rib or channel waveguide. The wavelength of the light source 12a1 may be selected from the wavelength band in which optical loss of the waveguides 12a2 is minimized. In some arrangements, the light source 12a1 may be a part of the optical emitter 13 in FIG. 1A or may be implemented by using the optical emitter 13.

The light splitters 12a3 may include Y-branch splitters, directional couplers, multimode interference (MMI) couplers, etc. The light splitters 12a3 may be configured to split or distribute the light from the light source 12a1 to N rows of the phase shifters 12a4 (where N is a natural number greater than 1). The light splitters 12a3 may be prepared with a single light splitter for distributing light at 1:N or by connecting N light splitters to each other in a multiple stage manner. FIG. 1D shows one example of the light splitters 12a3 in which 1:2 light splitters are connected in three stages for the purpose of 1:8 distribution.

The phase shifters 12a4 may include grating couplers. The phase shifters 12a4 may be arranged in a periodic grid. The phase shifters 12a4 may affect the phases of the transmitted light. For example, the phase shifters 12a4 may be configured to control or tune delay lines of the transmitted light. As the delay lines are tuned, each radiator 12a5 emits light with a desired amplitude and phase to form a desired radiation pattern through interference. In some arrangements, the thermo-optic actuation mechanism may be used to tune the delay lines.

The radiators 12a5 may couple light out of the plane of the photonic component 12 in FIG. 1A. The radiators 12a5 may include, but are not limited to, antennas, gratings, holographic optical elements (HOE), mirrors, total internal reflection (TIR) interfaces, and lenses.

Figure 2:
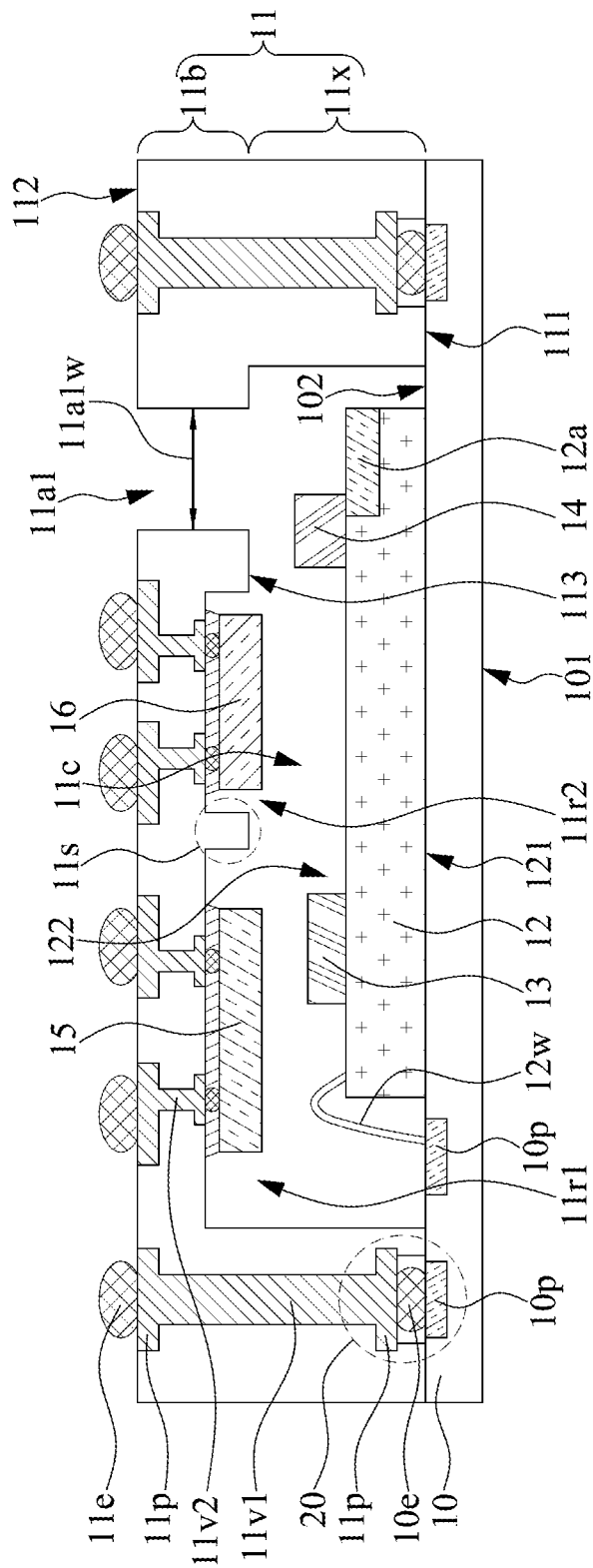
FIG. 2 illustrates a side view of an example of an optical module according to some arrangements of the present disclosure.

FIG. 2 illustrates a side view of an example of an optical module 2 according to some arrangements of the present disclosure. The optical module 2 is similar to the optical module 1a in FIG. 1A except for the differences described as follows.

As indicated by the dotted circle 20, the interconnection structure 11 may define a cavity for accommodating or receiving the electrical contacts 10e. The surface 111 of the interconnection structure 11 may contact (such as directly contact) the surface 102 of the carrier 10. The electrical contacts 10e may be disposed in the cavity recessed from the surface 111 of the interconnection structure 11 and may contact the conductive pads 11p. In some arrangements, by forming the cavity for accommodating or receiving the electrical contacts 10e, the electrical contacts 10e can be sealed in the cavity and there may be no gap between the surface 111 of the interconnection structure 11 and the surface 102 of the carrier 10. The interconnection structure 11 can be supported by the surface 102 of the carrier 10, and the structural stability of the optical module 2 can be increased.

Figure 3:
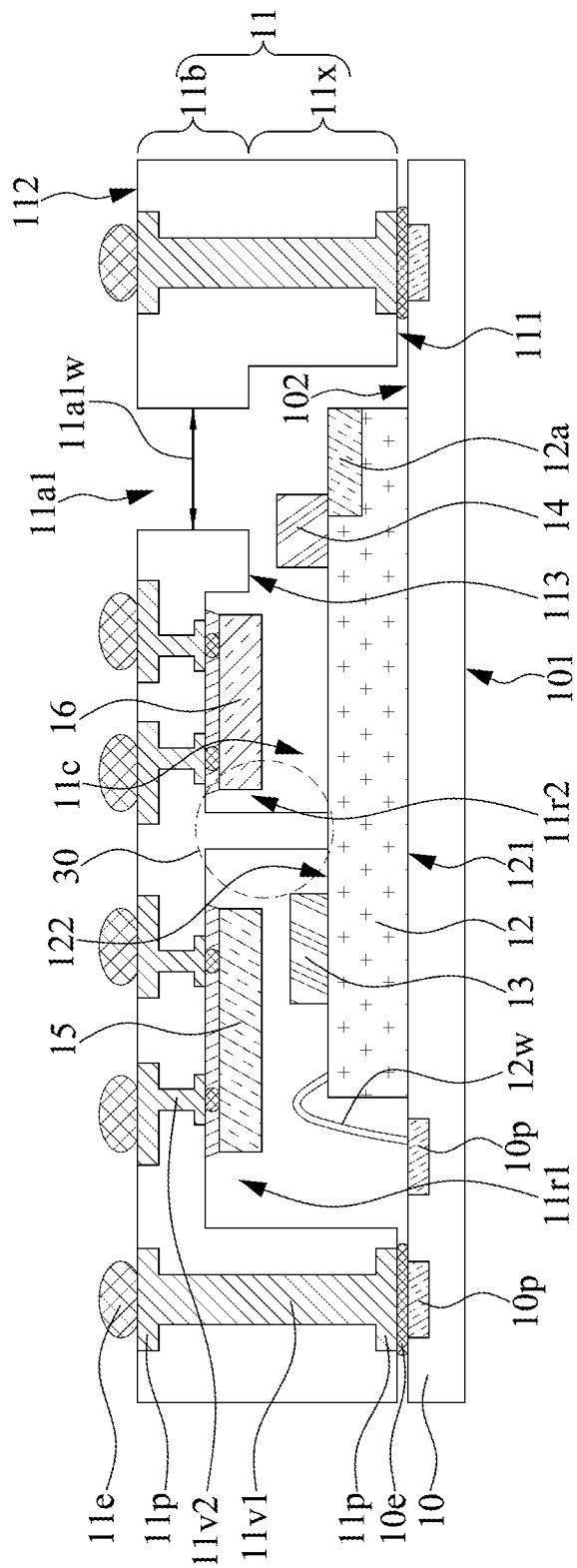
FIG. 3 illustrates a side view of an example of an optical module according to some arrangements of the present disclosure.

FIG. 3 illustrates a side view of an example of an optical module 3 according to some arrangements of the present disclosure. The optical module 3 is similar to the optical module 1a in FIG. 1A except for the differences described as follows.

The protruding portion 30 may protrude from the recessed portions 11r1 and 11r2, and extend to the surface 122 of the photonic component 12. The protruding portion 30 may contact the surface 122 of the photonic component 12. In some arrangements, since the protruding portion 30 can provide structural support for the interconnection structure 11, the structural stability of the optical module 3 can be increased.

Figure 4A:
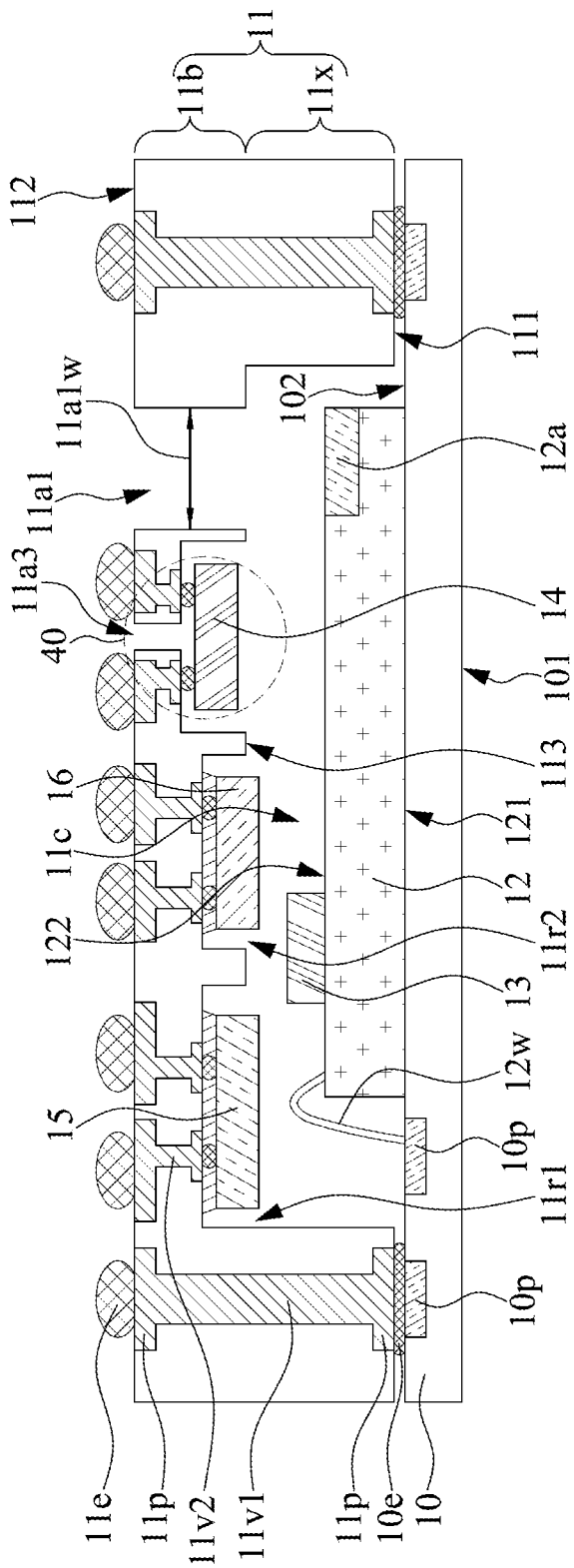
FIG. 4A illustrates a side view of an example of an optical module according to some arrangements of the present disclosure.

FIG. 4A illustrates a side view of an example of an optical module 4a according to some arrangements of the present disclosure. The optical module 4a is similar to the optical module 1a in FIG. 1A except for the differences described as follows.

As indicated by the dotted circle 40, the optical receiver 14 may be disposed over or on the interconnection structure 11. The optical receiver 14 may be electrically connected to the interconnection structure 11 through solder bonding, Cu-to-Cu bonding, wire bonding, or hybrid bonding. For example, the optical receiver 14 may be electrically connected to the interconnection structure 11 using electrical contacts over (e.g., contacting directly) the interconnection structure 11.

The interconnection structure 11 may have or define a recessed portion for accommodating or receiving the optical receiver 14. The light reception area of the optical receiver 14 may face an aperture 11a3 of the interconnection structure 11.

The optical receiver 14 may be configured to receive the light passing through the aperture 11a3 of the interconnection structure 11, generate electrical signals (e.g., an electrical current), and transmit the electrical signals to the electronic components 15 and/or 16. In some arrangements, the electrical signals generated by the optical receiver 14 may be transmitted to the electronic components 15 and/or 16 through the interconnection structure 11. In comparison with the optical module 1a in FIG. 1A, the light reception path may be shorter, insertion loss may be decreased and sensibility of the optical receiver 14 may be improved.

Figure 4B:
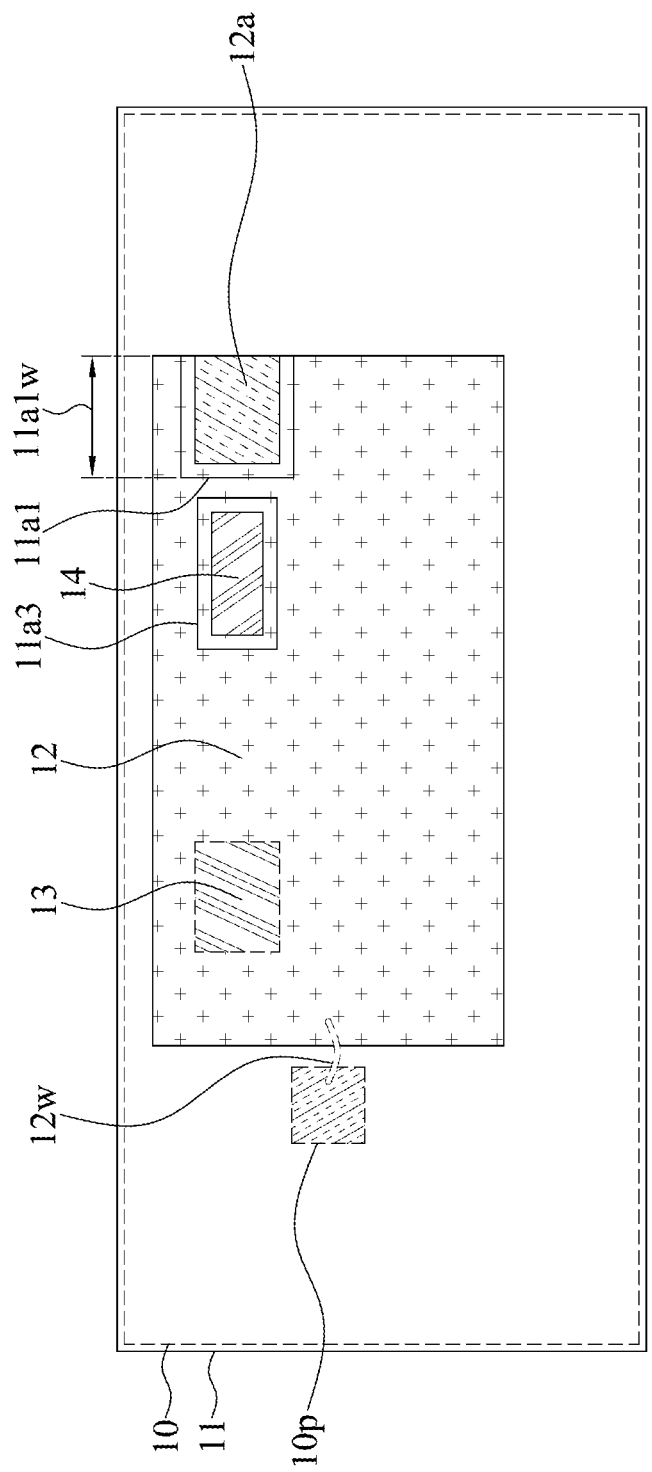
FIG. 4B illustrates a top view of an example of an optical module according to some arrangements of the present disclosure.

FIG. 4B illustrates a top view of an example of the optical module 4a according to some arrangements of the present disclosure. Some elements or components in FIG. 4A are omitted in FIG. 4B for conciseness.

The aperture 11a3 may be spaced apart from the aperture 11a1. The aperture 11a3 may be similar to the aperture 11a1 and a description thereof is not repeated hereinafter for conciseness.

The optical receiver 14 and the aperture 11a3 may be at least partially overlapped. The optical receiver 14 may be at least partially exposed from the aperture 11a3. In some arrangements, the aperture 11a3 may be configured to allow light to pass through and to be detected by the optical receiver 14. In some arrangements, a width 11a1w of the aperture 11a3 may be greater than (e.g., is about 10% greater than, about 20% greater than, about 30% greater than, or more than about 30% greater than) a width of the optical receiver 14. In some arrangements, the size of the apertures can be scaled down to prevent undesired light being detected and to thus increase the accuracy of the optical module 4a.

FIG. 5A illustrates an interactive diagram of an optical module 5 and an object according to some arrangements of the present disclosure. The optical module 5 is similar to the optical module 1a in FIG. 1A except for the differences described as follows.

The optical module 5 may further include a carrier 50, an optical emitter 51, and an optical receiver 52. The carrier 50, the optical emitter 51, and the optical receiver 52 may be similar to the carrier 10, the optical emitter 13, and the optical receiver 14, respectively, of FIG. 1A. Therefore, some details of the carrier 50, the optical emitter 51, and the optical receiver 52 may correspond to the paragraphs described above for FIG. 1A, and a description thereof is not repeated hereinafter for conciseness.

The carrier 50 may have or define a hole, a through hole, or an aperture 50a. The aperture 50a may be at least aligned with the aperture 11a1. In some arrangements, the aperture 50a may be configured to allow light to pass through. For example, the light radiated from the OPA 12a of the photonic component 12 may pass through the aperture 50a.

For example, the light beam (such as the light beam L1) radiated from the OPA 12a may pass through the aperture 11a1 and the aperture 50a and may be received by (or may radiate) the object. The object may include any suitable object that is moving or stationary relative to the optical module 5. The object may scatter or reflect at least a portion of light from the light beam L1, and the scattered or reflected light beam L2 may return toward the optical module 5 and be received by the optical receiver 14. FIG. 5 illustrates that the OPA 12a and the optical receiver 14 are exposed from the same aperture 11a1.

In some arrangements, the light beam (such as the light beam L3) radiated from the optical emitter 51 may be received by (or may radiate) the object. The object may scatter or reflect at least a portion of light from the light beam L3, and the scattered or reflected light beam L4 may return toward the optical module 5 and be received by the optical receiver 52. The optical receiver 52 may have a receiving surface facing away from the carrier 50 and the interconnection structure 11.

The electronic component 15 and/or the electronic component 16 may be configured to analyze one or more characteristics of electrical signals from the optical receiver 14 and/or the optical receiver 52 to determine one or more characteristics of the object. The electronic component 15 and/or the electronic component 16 may control the optical emitter 13 and/or the optical emitter 51 based on the electrical signals from the optical receiver 14 and/or the optical receiver 52.

In some arrangements, the light beam (such as the light beam L1) radiated from the OPA 12a and the light beam (such as the light beam L3) radiated from the optical emitter 51 may have different properties, such as different luminous flux (or luminous power, or brightness), different luminous intensity, different propagation direction, different wavelength (or frequency, or bandwidth), different polarization state, etc. In some arrangements, the electrical signals from the optical receiver 14 and the electrical signals from the optical receiver 52 may be used to determine different characteristics of the object, such as different biological parameters.

In some arrangements, the optical receiver 14 may be disposed over the carrier 50. For example, the optical receiver 14 may be disposed over or on a surface of the carrier 50 facing away from the interconnection structure 11. For example, the optical receiver 14 may be disposed adjacent to the optical emitter 51 and/or the optical receiver 52.

Figure 6A:
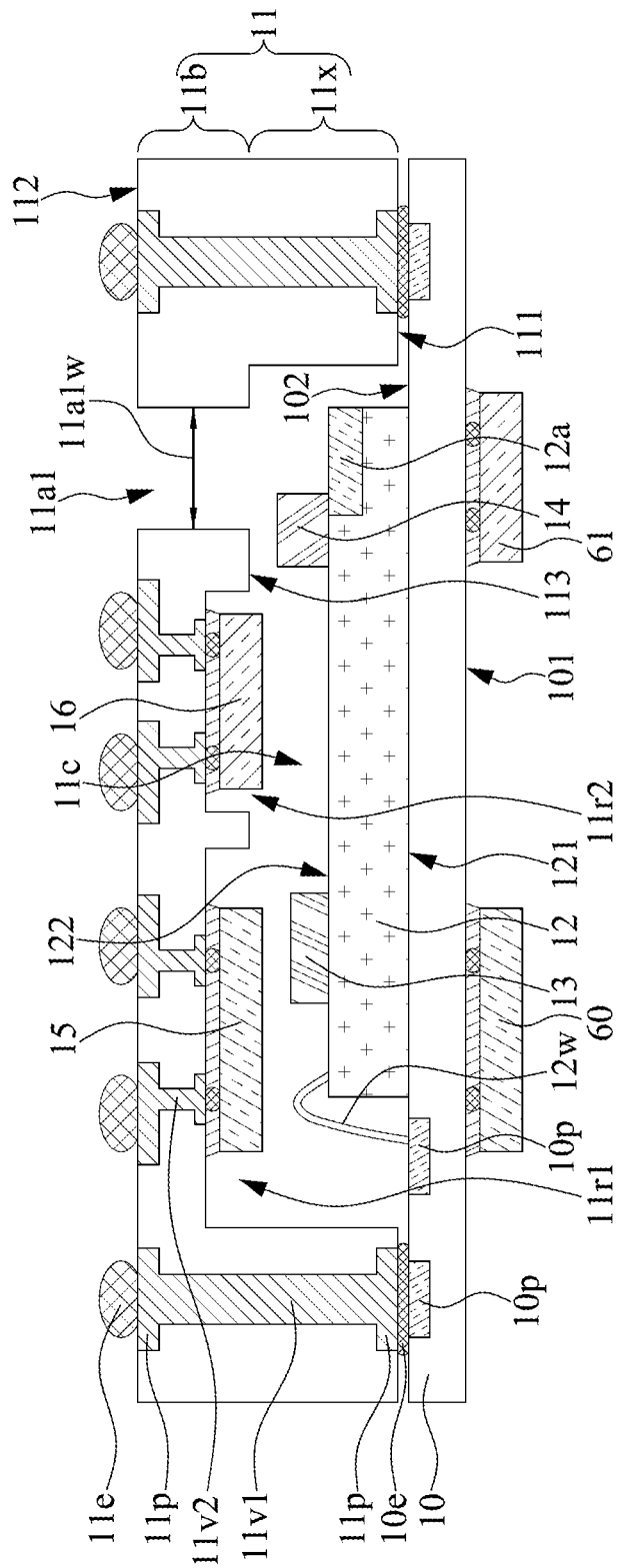
FIG. 6A illustrates a side view of an example of an optical module according to some arrangements of the present disclosure.

FIG. 6A illustrates a side view of an example of an optical module 6a according to some arrangements of the present disclosure. The optical module 6a is similar to the optical module 1a in FIG. 1A except for the differences described as follows.

The optical module 6a includes electronic components 60 and 61 disposed over or on the surface 101 of the carrier 10. The electronic components 60 and 61 may be similar to the electronic components 15 and 16 and a description thereof is not repeated hereinafter for conciseness. The positions and number of the electronic components 60 and 61 in the optical module 6a are not intended to limit the present disclosure. For example, there may be any number of electronic component(s) in the optical module 6a due to design needs. The electronic components 60 and 61 may be electrically connected to the photonic component 12 through the carrier 10.

Figure 6B:
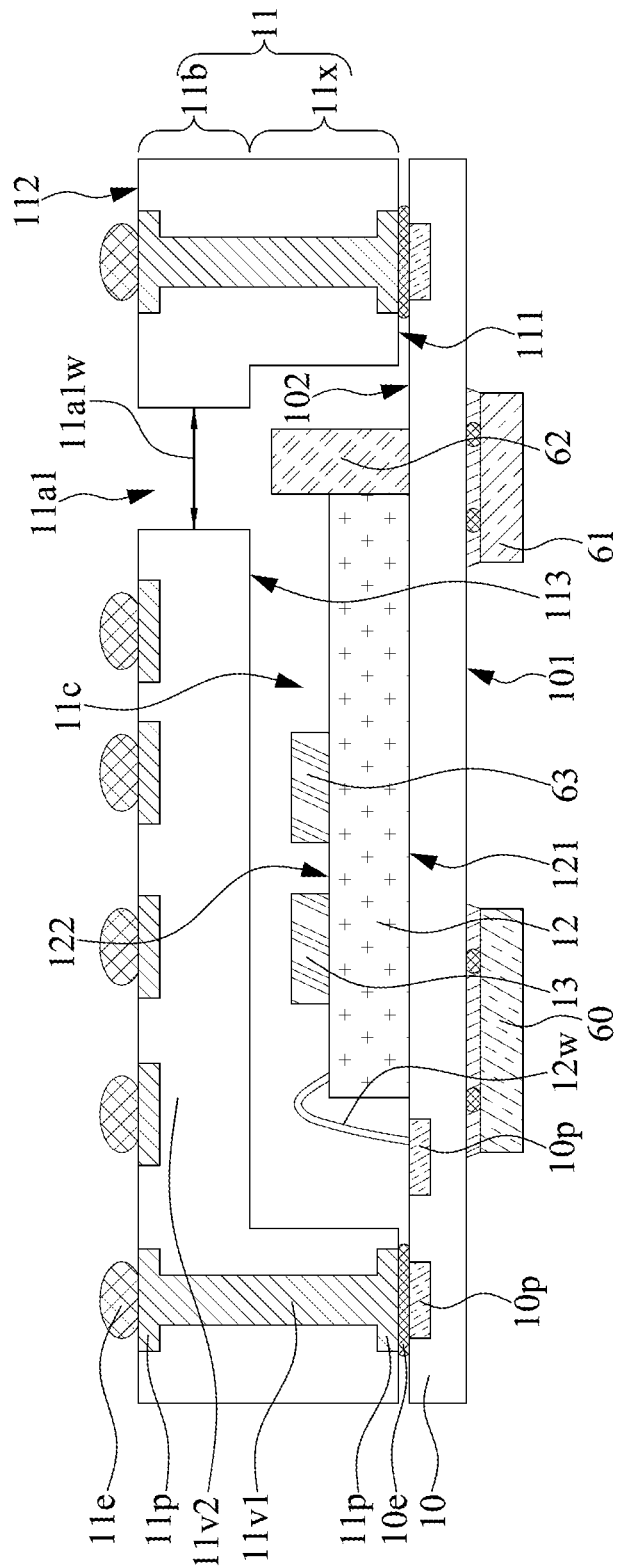
FIG. 6B illustrates a side view of an example of an optical module according to some arrangements of the present disclosure.

FIG. 6B illustrates a side view of an example of an optical module 6b according to some arrangements of the present disclosure. The optical module 6b is similar to the optical module 6a in FIG. 6A except for the differences described as follows.

The optical module 6b includes an optical component 62 and an optical emitter 63. The optical component 62 may be disposed over the carrier 10. The optical component 62 may be disposed adjacent to the photonic component 12 or contact the photonic component 12. The optical component 62 may have a top surface at least partially overlapped with the aperture 11a1 in a direction substantially perpendicular to the surface 101 and/or the surface 102 of the carrier 10. The top surface of the optical component 62 may be higher than the surface 122 of the photonic component 12.

The optical component 62 may include a beam splitter, such as a polarization beam splitter (PBS). The optical component 62 may have a cube shape. The optical component 62 may include triangular glass prisms which are glued (using an index-matched adhesive, such as polyester, epoxy, or urethane-based adhesive) together at their base and have a coating in between. However, a beam splitter of any shape or size can be acceptable. In some arrangements, the optical component 62 may include one or more surfaces for receiving input light beams from the photonic component 12 and one or more surfaces for transmitting output light beams toward the aperture 11a1. In some arrangements, the optical component 62 may be configured to split an input light beam into two or more output light beams based on one or more properties, such as luminous flux (or luminous power, or brightness), luminous intensity, propagation direction, wavelength (or frequency, or bandwidth), polarization state, etc.

The optical emitter 63 may be disposed over the surface 122 of the photonic component 12 and laterally spaced apart from the optical emitter 13. The optical emitter 63 may be similar to the optical emitter 13 and a description thereof is not repeated hereinafter for conciseness. In some arrangements, the optical component 62 may be replaced with the OPA 12a shown in FIG. 1A to increase the space utilization and achieve size reduction.

Figure 7A:
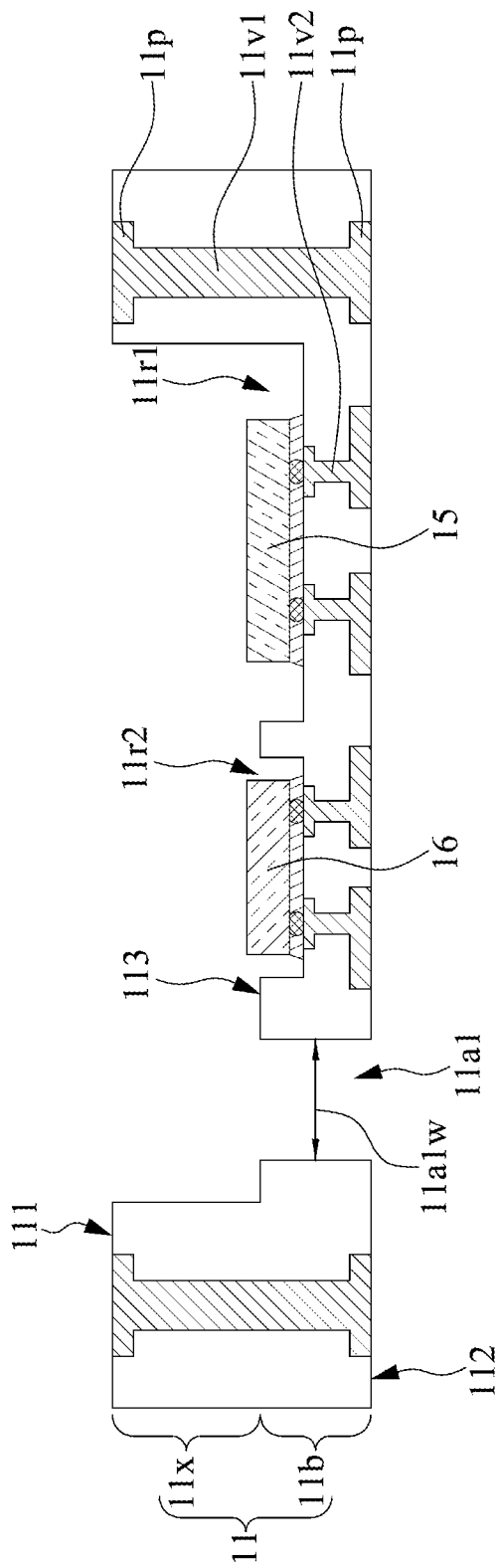
FIGS. 7A, 7B, and 7C illustrate cross-sectional views in one or more stages of a method of manufacturing an optical module in accordance with an arrangement of the present disclosure.
Figure 7B:
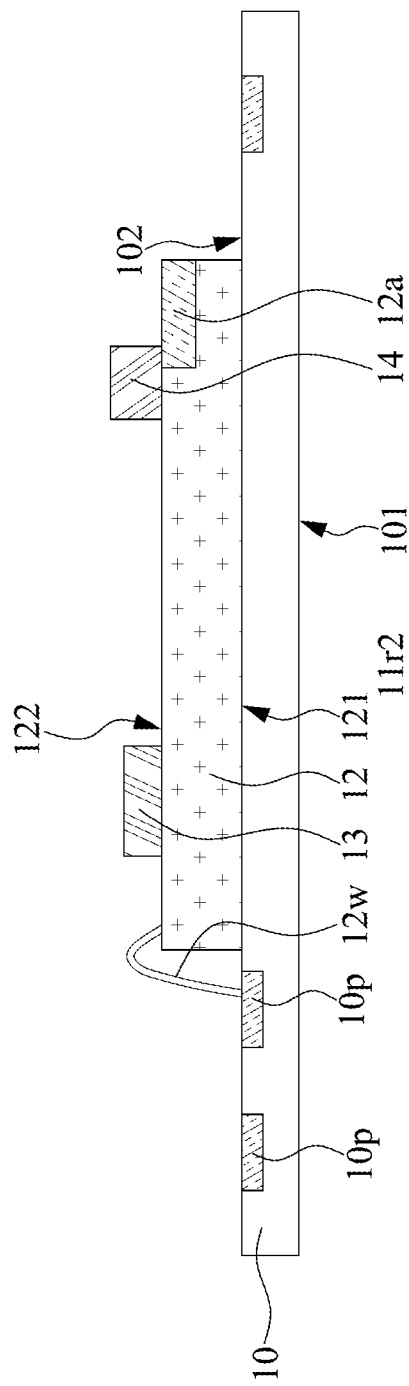
Figure 7C:
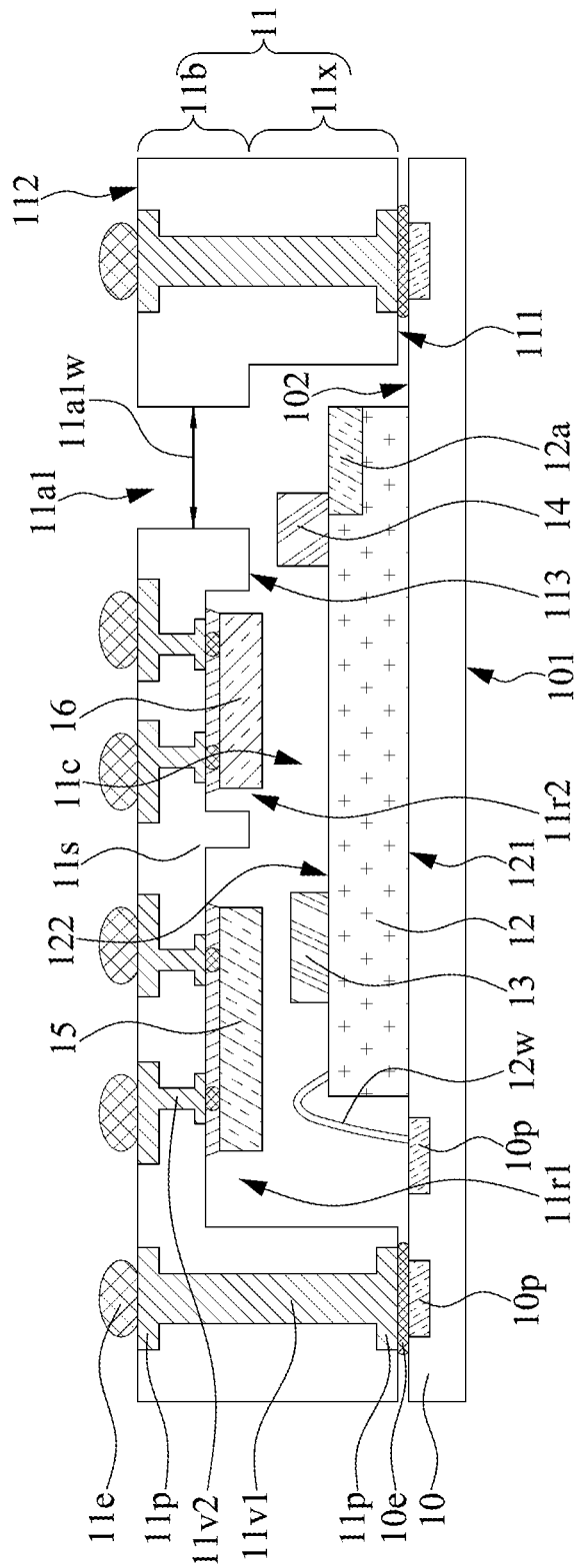

FIGS. 7A, 7B, and 7C illustrate cross-sectional views in one or more stages of a method of manufacturing an optical module in accordance with an arrangement of the present disclosure. In some arrangements, the optical module 1a may be manufactured through the operations described with respect to FIGS. 7A, 7B, and 7C.

Referring to FIG. 7A, the interconnection structure 11 is provided. In some arrangements, the extending portion 11x and the base portion 11b of the interconnection structure 11 may include a monolithic structure. In some arrangements, the extending portion 11x and the base portion 11b of the interconnection structure 11 may be formed of one piece. In some arrangements, the extending portion 11x and the base portion 11b of the interconnection structure 11 may be pieces separately formed and then combined together.

In some arrangements, the encapsulant 11m may be formed by molding, such as by printing, compressive molding, transfer molding, liquid encapsulant molding, vacuum lamination, spin coating, or other suitable processes. The aperture 11a1 may be formed in the interconnection structure 11 by a computer numerical controlled (CNC) machine. The aperture 11a1 may be formed by photolithography, chemical etching, laser drilling, or other suitable processes.

The electronic component 15 may be disposed or received in the recessed portion 11r1 and the electronic component 16 may be disposed or received in the recessed portion 11r2.

Referring to FIG. 7B, the photonic component 12 may be disposed over or on the carrier 10. The optical emitter 13 may be disposed over the surface 122 of the photonic component 12. The optical receiver 14 may be disposed over the surface 122 of the photonic component 12.

Referring to FIG. 7C, the interconnection structure 11 may be disposed over or on the carrier 10 to cover the photonic component 12. The interconnection structure 11 may be arranged so that the aperture 11a1 may be at least partially overlapped with the OPA 12a in a direction substantially perpendicular to the surface 101 and/or the surface 102 of the carrier 10.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of arrangements of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to +10% of that numerical value, such as less than or equal to +5%, less than or equal to +4%, less than or equal to +3%, less than or equal to +2%, less than or equal to #1%, less than or equal to +0.5%, less than or equal to +0.1%, or less than or equal to +0.05%. For example, two numerical values can be deemed to be "substantially" the same or equal if a difference between the values is less than or equal to +10% of an average of the values, such as less than or equal to +5%, less than or equal to +4%, less than or equal to +3%, less than or equal to +2%, less than or equal to +1%, less than or equal to +0.5%, less than or equal to +0.1%, or less than or equal to +0.05%.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific arrangements thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other arrangements of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical module, comprising:
a carrier;
a lid disposed over the carrier, wherein the carrier and the lid are collaboratively define a first cavity for accommodating a photonic component; and
a first electrical contact disposed over a first side of the lid and configured to provide an electronic connection for the optical module,
wherein a first aperture penetrating the lid and corresponds to a light transmission/reception area of the photonic component,
and wherein the lid is configured to provide a vertically electrical path to electrically connect the first electrical contact,
wherein the lid has a first portion extending from an upper surface of the carrier and a second portion connected to the first portion and over the photonic component, wherein the first electrical contact is disposed over an upper surface of the second portion.

2. An optical module, comprising:
an interconnection structure including a first aperture;
a die disposed over the interconnection structure;
a photonic component electrically connected to the die through the interconnection structure, and configured to generate a first light transmitted along a first propagation direction and to emit a second light transmitted along a second propagation direction toward the first aperture,
wherein the first propagation direction is different from the second propagation direction; and
an optical receiver disposed over the photonic component, wherein the photonic component comprises an optical phased array,
and wherein the photonic component is configured to emit a first optical signal through the optical phased array and receive a second optical signal through the optical receiver.

3. The optical module of claim 1, wherein a transmission direction of the vertically electrical path is substantially parallel to a transmission direction of a light transmitted to or from the light transmission/reception area of the photonic component.

4. The optical module of claim 1, wherein the lid is configured to provide a plurality of electrical paths penetrating the lid.

5. The optical module of claim 1, wherein the photonic component is electrically connected to the first electrical contact through the carrier.

6. The optical module of claim 1, wherein the vertically electrical path penetrates the second portion of the lid.

7. The optical module of claim 1, wherein the first electrical contact is protruded from the upper surface of the second portion of the lid.

8. The optical module of claim 1, wherein the first electrical contact comprises a solder material.

9. The optical module of claim 1, further comprising:
a die disposed under a lower surface of the second portion of the lid and electrically connected to the first electrical contact through the lid.

10. The optical module of claim 9, wherein the second portion of the lid defines a recessed portion accommodating the die.

11. The optical module of claim 2, wherein the first aperture is configured to allow the first optical signal and the second optical signal to pass through.

12. The optical module of claim 2, wherein an active surface of the photonic component faces the first aperture.

13. The optical module of claim 2, wherein the die is disposed between the interconnection structure and the photonic component, and the die is spaced apart from the photonic component by air.

14. The optical module of claim 13, wherein the die is attached to the interconnection structure through a solder material.

\* \* \* \* \*